US012637581B2

(12) United States Patent
Wang et al.

(10) Patent No.: US 12,637,581 B2
(45) Date of Patent: May 26, 2026

(54) SOUND ABSORPTION MATERIAL BLOCK AND METHOD MADE THEREOF

(71) Applicant: AAC Microtech (Changzhou) Co., Ltd., Changzhou (CN)

(72) Inventors: Zhongyang Wang, Changzhou (CN); Jie Zhang, Changzhou (CN); Hezhi Wang, Changzhou (CN); Chao Wang, Changzhou (CN)

(73) Assignee: AAG Microtech (Changzhou) Co., Ld., Changzhou (CN)

( * ) Notice: Subject to any disclaimer, the term of this patent is extended or adjusted under 35 U.S.C. 154(b) by 210 days.

(21) Appl. No.: 18/736,541

(22) Filed: Jun. 7, 2024

(65) Prior Publication Data

US 2025/0230333 A1     Jul. 17, 2025

Related U.S. Application Data

(63) Continuation of application No. PCT/CN2024/071741, filed on Jan. 11, 2024.

(51) Int. Cl.
| | |
|---|---|
| *C09D 125/18* | (2006.01) |
| *C08J 7/04* | (2020.01) |
| *C09D 7/43* | (2018.01) |
| *C09D 7/61* | (2018.01) |
| *C09D 7/65* | (2018.01) |
| *G10K 11/162* | (2006.01) |

(52) U.S. Cl.
CPC .......... *C09D 125/18* (2013.01); *C08J 7/0427* (2020.01); *C09D 7/43* (2018.01); *C09D 7/61* (2018.01); *C09D 7/65* (2018.01); *G10K 11/162* (2013.01); *C08J 2325/18* (2013.01); *C08J 2401/10* (2013.01)

(58) Field of Classification Search
CPC .......... C09D 125/18; C09D 7/65; C09D 7/61; C09D 7/43; C08J 7/0427; G10K 11/162
See application file for complete search history.

(56) References Cited

FOREIGN PATENT DOCUMENTS

| | | | | | |
|---|---|---|---|---|---|
| CN | 109180992 A | * | 1/2019 | ............... | C08J 9/28 |
| CN | 113024156 A | * | 6/2021 | ............. | C04B 28/00 |
| CN | 116162415 A | * | 5/2023 | ............. | C09J 7/245 |
| CN | 117624721 A | * | 3/2024 | ............. | C08J 7/0427 |

* cited by examiner

*Primary Examiner* — Jeremy A Luks
(74) *Attorney, Agent, or Firm* — Wiersch Law Group

(57) ABSTRACT

The present disclosure discloses a sound absorption material block having a gradient pore diameter from inside to outside, including: an outer portion having a first pore diameter; and an inner portion encapsulated by the outer portion, having a second pore diameter; the first pore diameter is in a range of 20-200 μm, the second pore diameter is in a range of 1-20 μm; the sound absorption material block has a thickness in a range of 0.5-5 mm. The sound absorption material block in the present disclosure has lower damping property and higher intensity.

6 Claims, 2 Drawing Sheets

SOUND ABSORPTION MATERIAL BLOCK AND METHOD MADE THEREOF

FIELD OF THE PRESENT DISCLOSURE

The present disclosure relates to sound absorption material technologies, especially relates to a sound absorption material block.

DESCRIPTION OF RELATED ART

Speakers on mobile electronic devices have a small volume in the back cavity, and filling sound absorption material in the back cavity can effectively improve its low-frequency performance and significantly enhance acoustic quality. Specifically, sound absorption material filled in the back cavity may increase the virtual volume of the back cavity.

In related art, the sound absorption material is inorganic powder having a particle size under 10 μm that cannot be filled into back cavity directly because of leakage risk. Therefore, sound absorption power is generally molded into particles or monolithic material. However, owing to air vibration in the back cavity, the collision between the sound absorption particles may result in powder loss, thus reducing its sound absorption ability and even disabling the speaker. Even though the sound absorption material block can avoid above issues, it may obstruct the air flow in the back cavity because of its large size. Besides, the high damping property of the sound absorption material block results in lower sound absorption ability in partial regions. And, low intensity of general ultra-thin sound absorption film material limits its application.

Therefore, it is necessary to provide an improved sound absorption material block to overcome the problems mentioned above.

SUMMARY OF THE INVENTION

One object of the present disclosure is to provide a sound absorption material block with lower damping property and higher intensity.

A sound absorption material block having a gradient pore diameter from inside to outside, including: an outer portion having a first pore diameter; and an inner portion encapsulated by the outer portion, having a second pore diameter; wherein the first pore diameter is in a range of 20-200 μm, the second pore diameter is in a range of 1-20 μm; the sound absorption material block has a thickness in a range of 0.5-5 mm.

As an improvement, the gradient pore diameter is in gradient along at least one of a vertical direction, a horizontal direction, and a stagger direction.

As an improvement, further including 100 weight parts sound absorption powder, 3-15 weight parts binder, 1-10 weight parts thickener, and 80-200 weight parts water.

As an improvement, the sound absorption powder is a zeolite material having a particle size less than 10 μm; the zeolite material is chosen from MFI molecular sieve, MEL molecular sieve, and FER molecular sieve.

As an improvement, the binder is chosen from polyacrylate, styrene butadiene lotion, polystyrene acrylate, polystyrene acetate, polyurethane resin, and polyethylene vinyl acetate salt.

As an improvement, thickener is chosen from sodium carboxypropyl methylcellulose, sodium polyacrylate, polyacrylamide, sodium alginate, and gelatin.

Another object of the present disclosure is to provide a method preparing the above sound absorption material block, comprising steps:

Obtaining a mixed slurry by blending sound absorption power, binder, thickener, and water;

Filling the obtained mixed slurry into a pre-cooled mold cooled under −20° C.-0° C., and freezing the mold to crystallize the mixed slurry under −60° C. to −0° C. for obtaining a frozen crystalline slurry;

Obtaining the sound absorption material block by performing a freeze-drying process under a vacuum environment on the obtained frozen crystalline slurry.

BRIEF DESCRIPTION OF THE DRAWINGS

The accompanying drawings illustrate embodiments and constitute part of the specification, and together with the specification, serve to explain an exemplary embodiment of the present disclosure. The accompanying drawings shown are only for illustrative purposes and do not limit the scope of the claims. In all the accompanying drawings, same reference signs refer to similar but not necessarily identical elements.

DETAILED DESCRIPTION OF THE EXEMPLARY EMBODIMENT

In order to make the inventive objectives, features, and advantages of the present disclosure more understandable, the technical solutions in embodiments of the present disclosure will be described clearly and completely below with reference to the accompanying drawings in the embodiment of the present disclosure. It is apparent that the described embodiment is merely some of rather than all of the embodiments of the present disclosure. All other embodiments acquired by those skilled in the art without creative efforts based on the embodiments in the present disclosure shall fall within the protection scope of the present disclosure.

Figure 1:
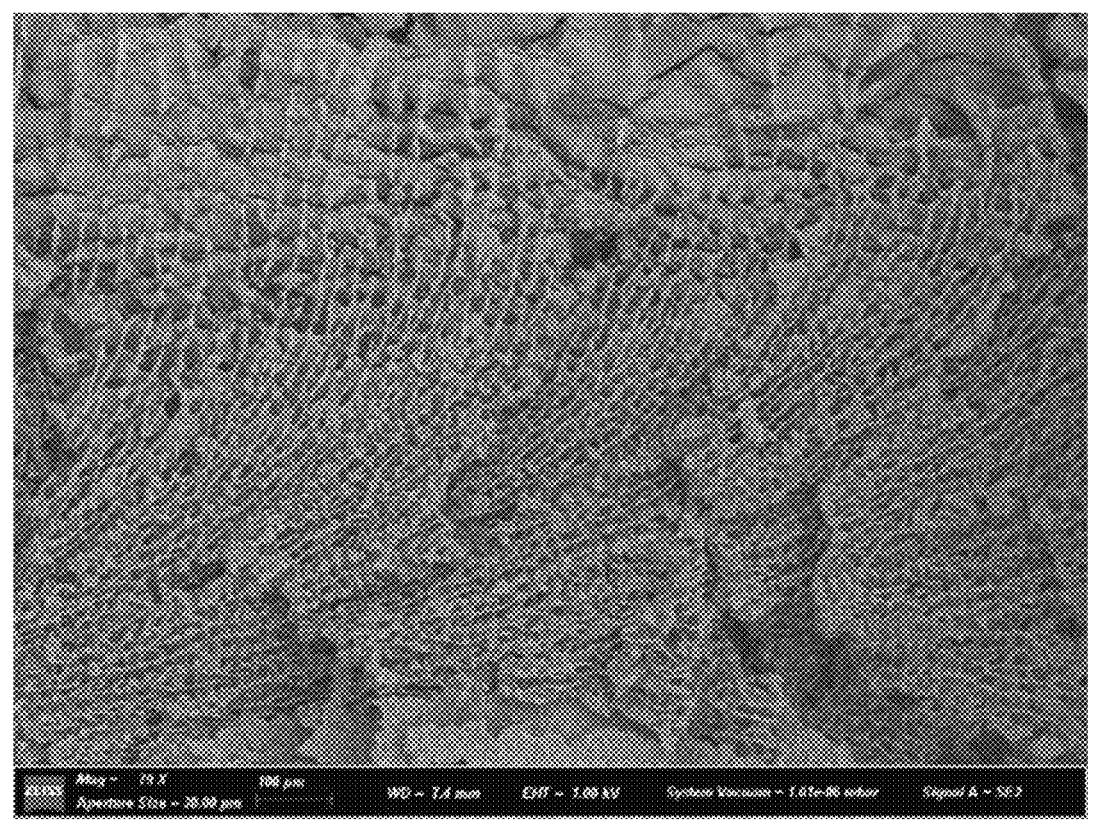
FIG. 1 is a SEM morphology image of a cross-section of a sound absorption material block in accordance with an exemplary embodiment of the present disclosure.
Figure 2:
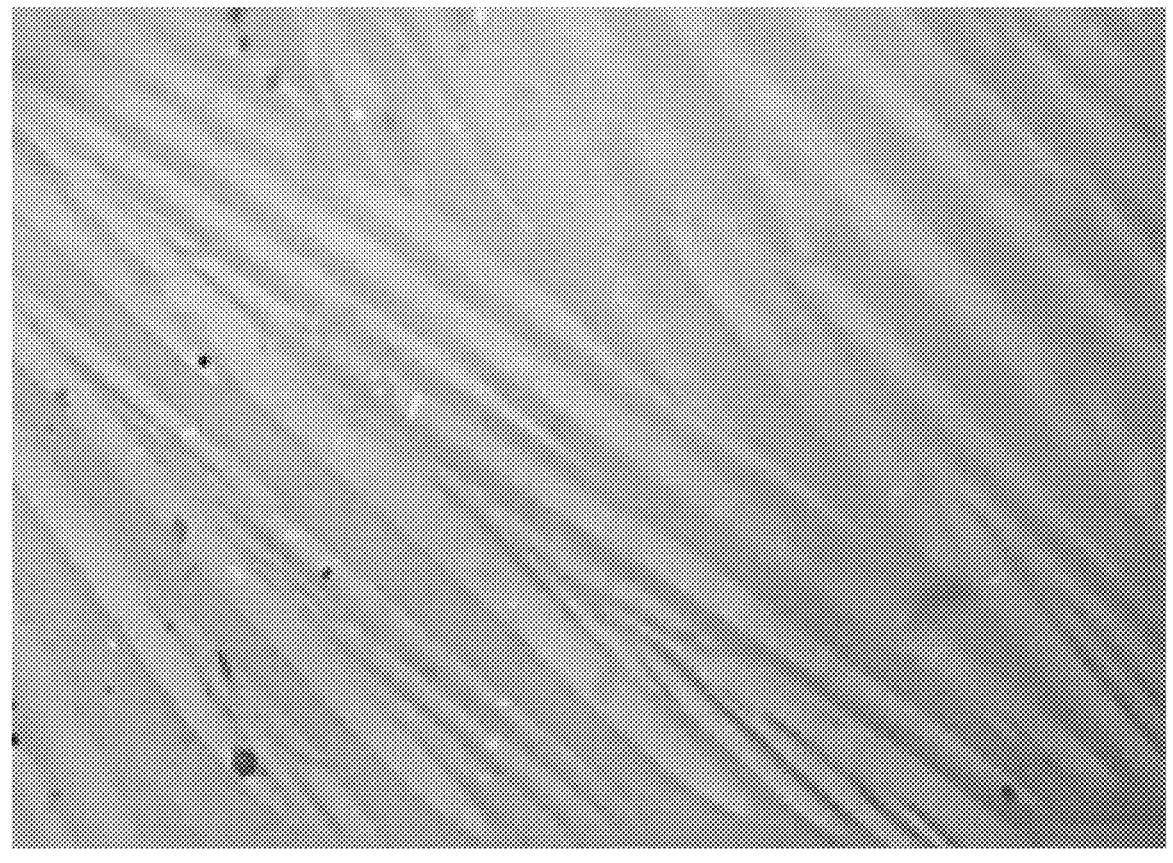
FIG. 2 is a microscopic morphology image of an outer surface of the sound absorption material block of the present invention.

Please refer to FIGS. 1-2, a sound absorption material block provided by an exemplary embodiment of the present disclosure has a gradient pore diameter from inside to outside. It should be understood that sound absorption material block is a porous structure that has a plurality of pores filled with sound absorption material. The sound absorption material filled in the pores is exposed to the air to achieve sound absorption function. Specifically, the sound absorption material block has a thickness in a range of 0.5-5 mm.

In one embodiment, the pore diameter of the sound absorption material block gradually increase from inside to outside. The gradient pore diameter between the pores can reduce air vibration damping. Furthermore, the adhesion intensity between the raw materials of the sound absorption material block is high enough to ensure the stability of this porous structure and avoid powder loss issue. Concretely, the sound absorption material block includes an outer portion having a first pore diameter, and an inner portion encapsulated by the outer portion. The inner portion has a second pore diameter. The first pore diameter of the outer portion is in a range of 20-200 μm. Therefore, when the sound absorption material block is abutted to a surface enclosed the back cavity, the sound absorption material received in the pores can still be exposed to air for achieving sound absorption function, thus enabling the sound absorption material block be applied in back cavities with various irregular shape.

In one embodiment, the second pore diameter of the inner portion of the sound absorption material block is in a range of 1-20 μm. Specifically, the pore diameter shows a gradient increased change from a geometric center of the sound absorption material block towards the surface. The pores of the inner portion are small and in honeycomb shape. The pores of the outer portion are larger and more regular than the pores of the inner portion.

As shown in FIG. 1, the gradient pore diameter is in gradient along at least one of a vertical direction, a horizontal direction, and a stagger direction.

In one embodiment, the sound absorption material block includes 100 weight parts sound absorption powder, 3-15 weight parts binder, 1-10 weight parts thickener, and 80-200 weight parts water. The thickener is configured to improve the adhesive intensity of the sound absorption material block, thus avoiding powder loss and ensuring the stability of the porous structure.

The sound absorption powder is a zeolite material having a particle size less than 10 μm. In addition, the zeolite material is chosen from MFI molecular sieve, MEL molecular sieve, and FER molecular sieve. The binder is chosen from polyacrylate, styrene butadiene lotion, polystyrene acrylate, polystyrene acetate, polyurethane resin, and polyethylene vinyl acetate salt. The thickener is chosen from sodium carboxypropyl methylcellulose, sodium polyacrylate, polyacrylamide, sodium alginate, and gelatin. It should be understood that the sound absorption material block can be integrated molded.

Moreover, a method preparing the sound absorption material block includes following steps. Firstly, obtaining a mixed slurry by blending sound absorption powder, binder, thickener, and water. Secondly, filling the obtained mixed slurry into a pre-cooled mold cooled under −20° C.-0° C., and freezing the mold to crystallize the mixed slurry under −60° C. to −0° C. for obtaining a frozen crystalline slurry. And then, obtaining the sound absorption material block by performing a freeze-drying process under a vacuum environment on the obtained frozen crystalline slurry.

In the preparing process, the porous structure form after the water crystallization sublimation. By optimizing the viscosity of the mixed slurry and the freezing temperature, the growth rate of the water crystallization can be controlled, thus resulting in a temperature gradient between the inner portion and the outer portion during the freeze-crystallize process. The dispersion force of the water crystallization in the frozen crystalline slurry reduces from outside to inside. As a result, the gradient pore diameter generates after freeze-drying process. Besides, the temperature gradient also affects the mixed slurry. Clearly, the lower the freeze temperature, the smaller of the particle size in solid state, as well as the lower the viscosity of mixed slurry, the larger pore diameter of the obtained sound absorption material block. Simultaneously, water crystallization and other solid components are mutually wrapped to form phagocytosis, thus forming a porous structure within the obtained sound absorption material block.

Embodiment 1

The method preparing the sound absorption material block in the present disclosure, including following steps:

Step 1: blending 100 weigh parts zeolite material, 10 weigh parts polystyrene acrylate, 5 weigh parts sodium carboxypropyl methylcellulose, and 150 weigh parts water, and then stirring for 1 hour to obtain a mixed slurry.

Step 2: cooling the mold under −10° C. for 1 hour, and then filling the obtained mixed slurry into the pre-cooled mold, freezing the mold to crystallize the mixed slurry under −40° C. for 30 mins for obtaining a frozen crystalline slurry.

Step 3: placing the obtained frozen crystalline slurry into a freeze dryer for 12 hours to dry, and then placing the dried frozen crystalline slurry into a hoven under 100° C. for 12 hours, obtaining the sound absorption material block after cooling to room temperature.

Comparison Embodiment 1

The method preparing the sound absorption material block in prior art, including following steps:

Step 1: blending 100 weigh parts zeolite material, 10 weigh parts acrylate lotion, 1 weigh part sodium carboxypropyl methylcellulose, and 150 weigh parts water, and then stirring for 1 hour to obtain a mixed slurry.

Step 2: filling the obtained mixed slurry into the mold, freezing the mold to crystallize the mixed slurry under −10° C. for 60 mins for obtaining a frozen crystalline slurry.

Step 3: placing the obtained frozen crystalline slurry into a freeze dryer for 12 hours to dry, and then placing the dried frozen crystalline slurry into a hoven under 100° C. for 12 hours, obtaining the sound absorption material block after cooling to room temperature.

For further verifying the superior properties of the sound absorption material block with gradient pore diameter, a 10*14*2 mm rectangular cylinder was fabricated for characterization comparison between regular sound absorption particles, embodiment 1, and comparison embodiment 1. Specifically, impedance test with cavity volume set as 0.4 ml, and drop test by dropping at 1 m with 10 cycles are conducted. The tested results are shown as table 1 below.

TABLE 1

| Sample | F0/Hz | Impedance/Ω | ΔF0/Hz | Result |
|---|---|---|---|---|
| Empty back cavity | 1024 | 15.6 | / | / |
| Regular sound absorption particles | 843 | 13.3 | 181 | Slight powder loss |
| Embodiment 1 | 821 | 13.6 | 203 | No powder loss |
| Comparison embodiment 1 | 856 | 12.1 | 68 | Powder loss/broken |

As shown in above table 1, the resonance frequency reduction performance ΔF0 of the sound absorption material block in embodiment 1 is 22 Hz higher than that of the regular sound absorption particles with same volume, and 35 Hz higher than that of the comparison embodiment 1. Moreover, the impedance of the sound absorption material block in embodiment 1 is also 0.3Ω higher that of the regular sound absorption particles, and 1.5Ω higher than that of the comparison embodiment 1. Owing to the higher air permeability resulted from the gradient pore diameter, the impedance of the sound absorption ability of the sound absorption material block of the present disclosure is higher than the sound absorption material in prior arts. The drop test result further shows the better adhesive intensity and stability of the sound absorption material block of the present disclosure.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A sound absorption material block having a gradient pore diameter from inside to outside, comprising:
   an outer portion having a first pore diameter; and
   an inner portion encapsulated by the outer portion, having a second pore diameter; wherein
   the first pore diameter is in a range of 20-200 $\mu$m, the second pore diameter is in a range of 1-20 $\mu$m;
   the sound absorption material block has a thickness in a range of 0.5-5 mm; and further comprising 100 weight parts sound absorption powder, 3-15 weight parts binder, 1-10 weight parts thickener, and 80-200 weight parts water.

2. The sound absorption material block as described in claim 1, wherein the gradient pore diameter is in gradient along at least one of a vertical direction, a horizontal direction, and a stagger direction.

3. The sound absorption material block as described in claim 1, wherein the sound absorption powder is a zeolite material having a particle size less than 10 $\mu$m; the zeolite material is chosen from MFI molecular sieve, MEL molecular sieve, and FER molecular sieve.

4. The sound absorption material block as described in claim 1, wherein the binder is chosen from polyacrylate, styrene butadiene lotion, polystyrene acrylate, polystyrene acetate, polyurethane resin, and polyethylene vinyl acetate salt.

5. The sound absorption material block as described in claim 1, wherein the thickener is chosen from sodium carboxypropyl methylcellulose, sodium polyacrylate, polyacrylamide, sodium alginate, and gelatin.

6. A method preparing the sound absorption material block as described in claim 1, comprising steps:
   obtaining a mixed slurry by blending the sound absorption power, binder, thickener, and water;
   filling the obtained mixed slurry into a pre-cooled mold cooled under $-20°$ C.$-0°$ C., and freezing the mold to crystallize the mixed slurry under $-60°$ C. to $-0°$ C. for obtaining a frozen crystalline slurry;
   obtaining the sound absorption material block by performing a freeze-drying process under a vacuum environment on the obtained frozen crystalline slurry.

\* \* \* \* \*